United States Patent [19]
Aschauer

[11] 4,372,434
[45] Feb. 8, 1983

[54] INTERLEAVED FRICTION PLATE CLUTCH HAVING MEANS TO PREVENT PLATE WOBBLE

[75] Inventor: George R. Aschauer, Racine, Wis.

[73] Assignee: Twin Disc, Incorporated, Racine, Wis.

[21] Appl. No.: 229,097

[22] Filed: Jan. 28, 1981

[51] Int. Cl.³ .................... F16D 25/063; F16D 17/72
[52] U.S. Cl. ................................ 192/85 AA; 192/86; 192/113 B
[58] Field of Search ............... 192/85 AA, 86, 113 B; 188/71.5, 71.6, 72.3, 264 D

[56] References Cited
U.S. PATENT DOCUMENTS 3,823,802 7/1974 Winzeler et al. ................ 192/86 X
3,924,717 12/1975 Ookubo et al. ...................... 192/86

*Primary Examiner*—Allan D. Herrmann
*Attorney, Agent, or Firm*—James E. Nilles

[57] ABSTRACT

A multiple, interleaved friction plate clutch in which the clutch plates have a fluid seal between them to permit fluid pressure to be built up in the space between the plates when they are in the clutch released, separated position, the plate sets are counter-rotating, and the head of oil built up between the plates positively holds both sets of clutch plates normal to the axis of rotation of the clutch and thereby prevents the plates from fluttering, wobbling or having other gyroscopic instabilities.

24 Claims, 7 Drawing Figures

INTERLEAVED FRICTION PLATE CLUTCH HAVING MEANS TO PREVENT PLATE WOBBLE

BACKGROUND OF THE INVENTION

Friction plate clutches have a provision for passing fluid such as oil between the clutch plates so as to lubricate or cool the plates. Furthermore other multi-plate clutches have attempted to prevent plate flutter and have been successful to some extent. Such devices are shown in U.S. Pat. No. 4,068,747 which issued Jan. 17, 1978 to Snoy and entitled "Multi-Plate Clutch Having Means to Prevent Clutch Flutter", wherein the outer periphery of the plates were formed as flat portions or spots which act as cams when the adjacent discs rotate relative thereto and thereby resist the tendency to flutter. U.S. Pat. No. 3,631,953 also issued to Snoy on Jan. 4, 1972 entitled "Friction Plate Clutch Having Means To Dampen Plate Flutter" utilized resilient means between the radially inner set of clutch plates and which purposely caused the plates to go into a mode of flutter so that the flutter could then be damped by split type outer clutch plates.

Yet another example of a prior art attempt to eliminate clutch flutter is shown in the Hilpert U.S. Pat. No. 3,472,348 issued Oct. 14, 1969 entitled "Clutch Having Radially Shiftable Means To Prevent Flutter", and wherein grooved weights were shifted radially outwardly so as to engage the inner periphery of the inner set of plates to thereby mechanically hold the plates in properly spaced relationship and resiliently prevent axial movement or flutter of the plates. These three above mentioned patents have been assigned to an assignee common with the present invention and while they did prove successful for their intended purposes in certain clutch uses, with the advent of very large clutches, the flutter problem continues to persist and has prohibited the use of friction plate clutches in extremely large installations, such as for example that are found in marine vessels.

Other types of multiple and interleaved friction plate clutches have attempted to control the coolant flow between the plates of a clutch, for the purpose of urging the clutch applying means to a clutch releasing direction or for maximizing the supply of cooling fluid to the plates upon engagement. However, the problem of clutch flutter does not occur when the clutch is engaged, but rather occurs when the clutch is in the release condition when the plates are separated from one another and the two sets of plates are counter-rotating.

SUMMARY OF THE PRESENT INVENTION

The present invention provides a multiple, interleaved friction plate clutch wherein sealing means are provided between the adjacent clutch plates so that fluid pressure can be built up between the clutch plates by causing the fluid to flow radially outwardly and inwardly in serpentine fashion and thus along the axial length of the clutch pack during which time the flow is inhibited so as to permit fluid pressure to be built up between the clutch plates and hold them positively in a normal attitude relative to the axis of rotation of the clutch. Fluid passage means are used to introduce the pressure fluid into the space between the clutch plates, when the clutch is released, and after the pressure fluid has flowed past the entire surfaces of the clutch plates, it is only then released from the clutch pack, usually at the axial end of the clutch pack. In this manner fluid pressure means are used to pressurize the space between the clutch plates when the clutch is in the released position and the head of fluid thereby positively holds the clutch plates and prevents their wobble. The released plates are held normal to the axis of rotation principally by the centrifugal thrust force generated by the oil head.

A more specific aspect of the invention relates to making the clutch plates of stepped configuration, that is to say formed generally as annular dish-shaped plates and each having an axially extending cylindrical wall, and wherein the adjacent cylindrical walls are telescopingly nested together and provided with sealing means therebetween which provides an axial sliding seal between the plates.

The dish-shaped plates also have a radially extending portion that terminates in teeth that provide a rotatable driving connection either with other adjacent plates or with the driving or driven member of the clutch. A more specific aspect of the invention provides the above type clutch pack used with a hydraulically actuated piston at each end of the pack for supplying opposed clamp up forces to the pack. In addition, a central floating separating plate is interposed intermediate the axial length of the pack to equalize clamp-up force among the plates.

DESCRIPTION OF A PREFERRED EMBODIMENT

Figure 1:
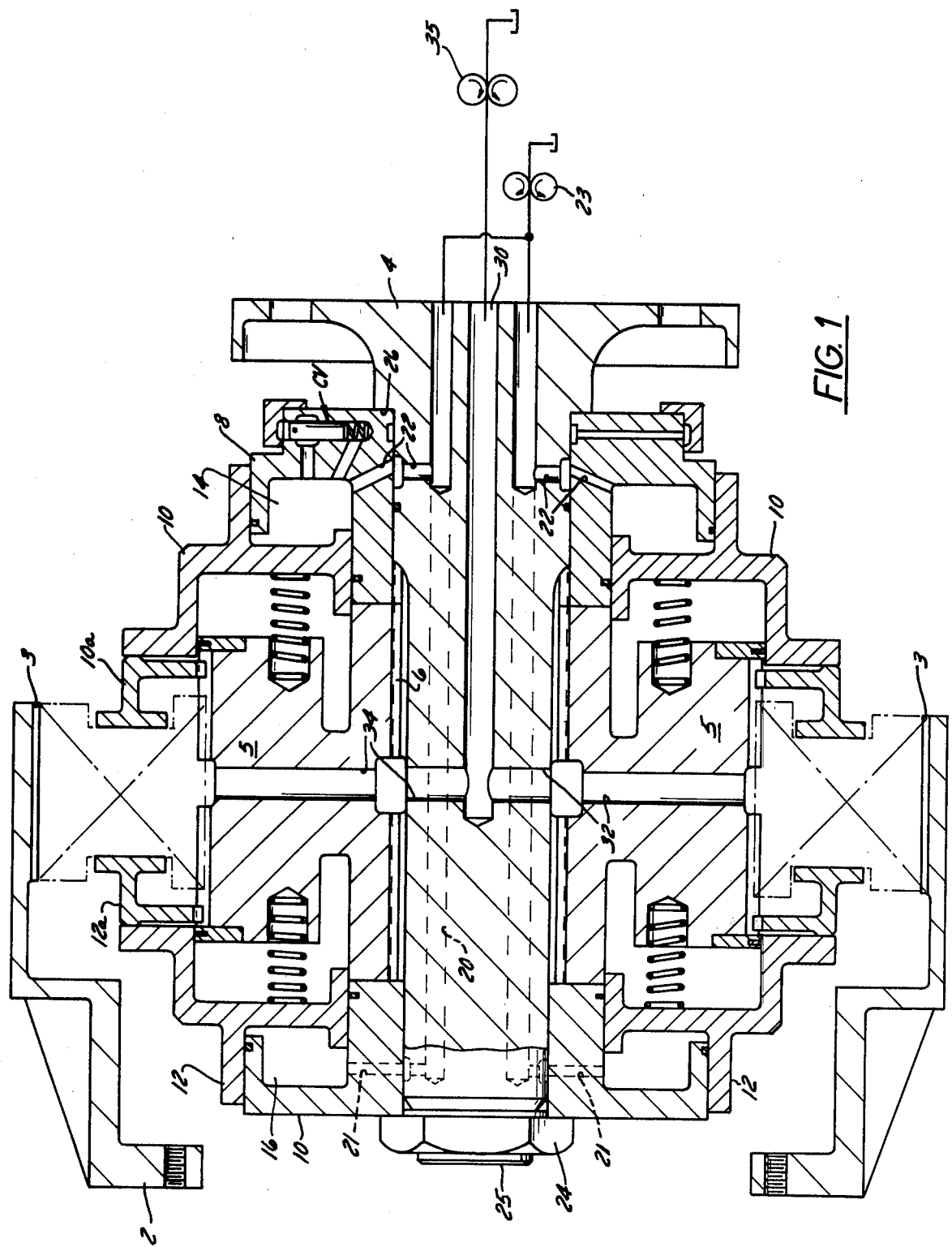
FIG. 1 is a transverse, cross-sectional view through a clutch embodying the present invention, and which clutch is of the double-acting type wherein pressure is applied to each end of the clutch pack so as to insure equal clutch apply pressure between the plates.

The clutch environment shown in FIG. 1 finds particular utility for use with and for illustrating the nove clutch pack of the present invention. In general, the clutch environment shown in FIG. 1 is of the general type shown in my U.S. Pat. No. 3,833,183 which issued Sept. 3, 1974 and entitled "Control System For A Power Transmission Clutch". Clutches of this type have dual actuating chambers which act as a fail-safe device in the event one or the other of the clutch actuating mechanisms fails to function. It should be noted that the number of clutch plates used with the present invention can vary and generally with a fewer number of clutch plates, only one clutch actuator would be required.

However, the present invention finds particular utility in large clutches, such as for example of 24 inches in diameter and where the force-per-plate due to flutter force could be as high as 10,000 pounds, and the clamp-up force per plate may be approximately 40,000 pounds. In multiple plate clutches with large numbers of plates, the plates receive less wear as their distance increases from the pressure applying member. As a result, the present invention finds particular utility when used with two clamping forces that are equal and opposite for the purpose of engaging the clutch as shown in FIG. 1. This double actuated clutch reduces the problems of degradation of torque-per-plate by approximately one-half.

It is believed sufficient to say for the purposes of the present invention that the clutch arrangement shown in FIG. 1 includes an input member in the form of an annular drum or spider 2 which has an internally splined surface 3 for driving engagement with clutch plates to be described and which also permit the clutch plates to axially slide in driving engagement with the spider 2. The clutch also includes an output shaft 4 having a hub portion 5 fixed for rotation therewith by the splined connection 6.

Opposed, hydraulically actuated means for clamping up the plates are provided and include actuating cylinder members 8 and 10 fixed on the shaft 4 for rotation therewith and together with their respective, axially shiftable, annular pistons 10 and 12 form the respective clutch actuating chambers 14 and 16. Clutch plate engaging members 10a and 12a are engaged by their respective pistons 10 and 12 to apply clamp-up force to the clutch pack as will appear.

Clutch actuating chambers are pressurizable by the introduction of pressure fluid through the rifle drilling 20 and cross ports 21 and 22 from a source of pressure fluid, such as pump 23, in the well known manner. A centrifugally operated control valve CV is provided and its function and construction are not deemed to be necessary to the present disclosure, but reference may be had if deemed to be necessary or desirable to the U.S. Pat. No. 3,352,395 issued to Hilpert on Nov. 17, 1967 and entitled "Friction Clutch Having Centrifugally Operated Valve Means" and which has been assigned to an assignee common to the present invention. A nut 24 threadably engaged on the end 25 of shaft 4 holds the cylinders and hub in assembled relationship against the shoulder 26 of the shaft.

It will be noted that fluid passage means 30 formed as a rifle drilling in the central portion of the shaft 4 and which interconnects with ports 32 and 34 permits the introduction of pressure fluid such as oil, from a source of pressure fluid such as pump 35, into the spaces between the clutch plates to be described, when the clutch is in the released position and the plate sets are counter-rotating.

Figure 2:
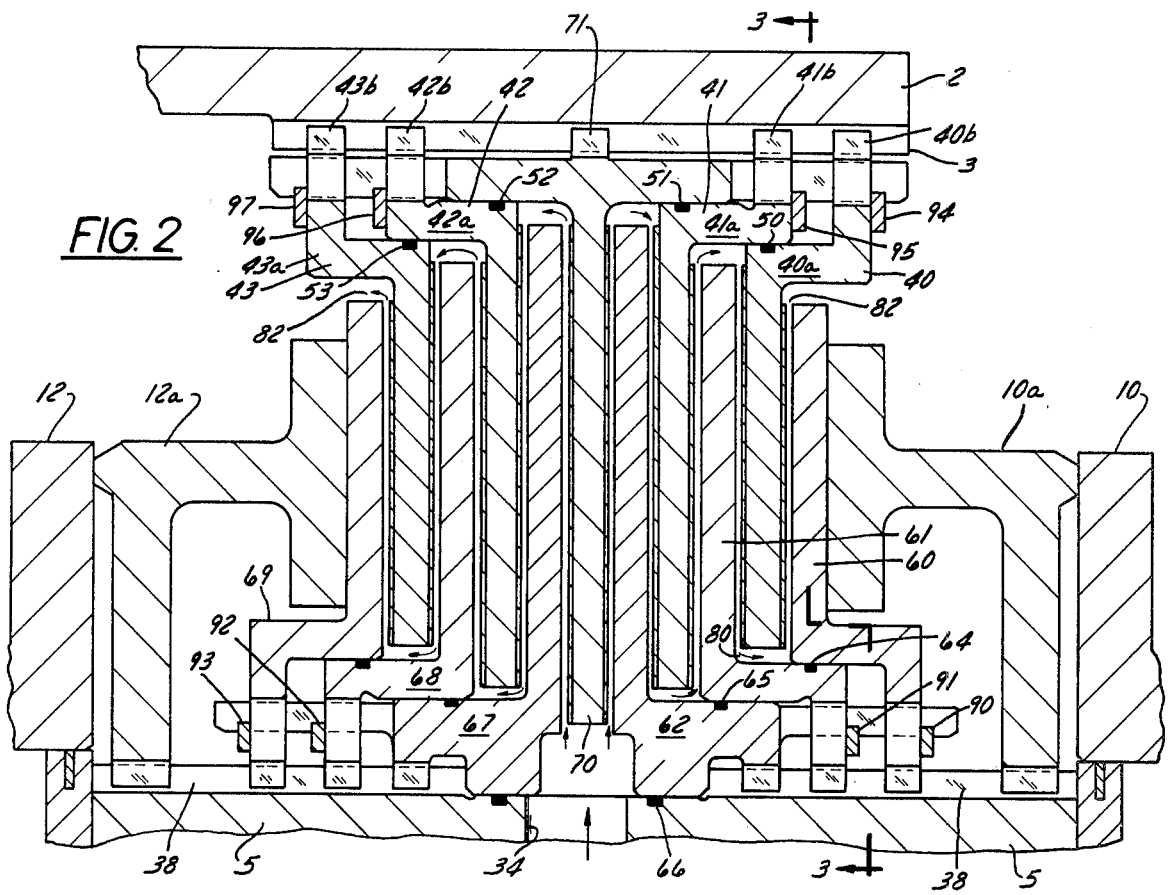
FIG. 2 is a fragmentary, axial cross-sectional view through a clutch pack embodying the present invention and which is adapted to be used in the clutch environment of FIG. 1, the view being enlarged from the FIG. 1 showing.
Figure 3:
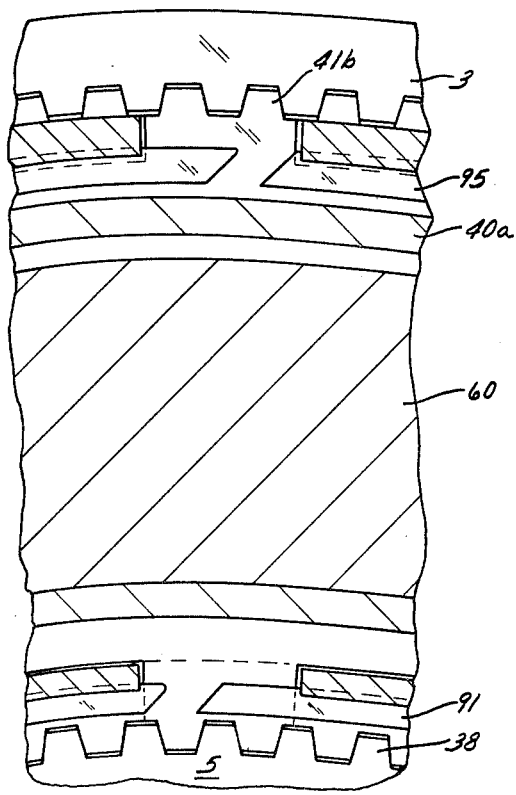
FIG. 3 is a fragmentary, transverse, cross-sectional view taken along the line 3—3 in FIG. 2.
Figure 4:
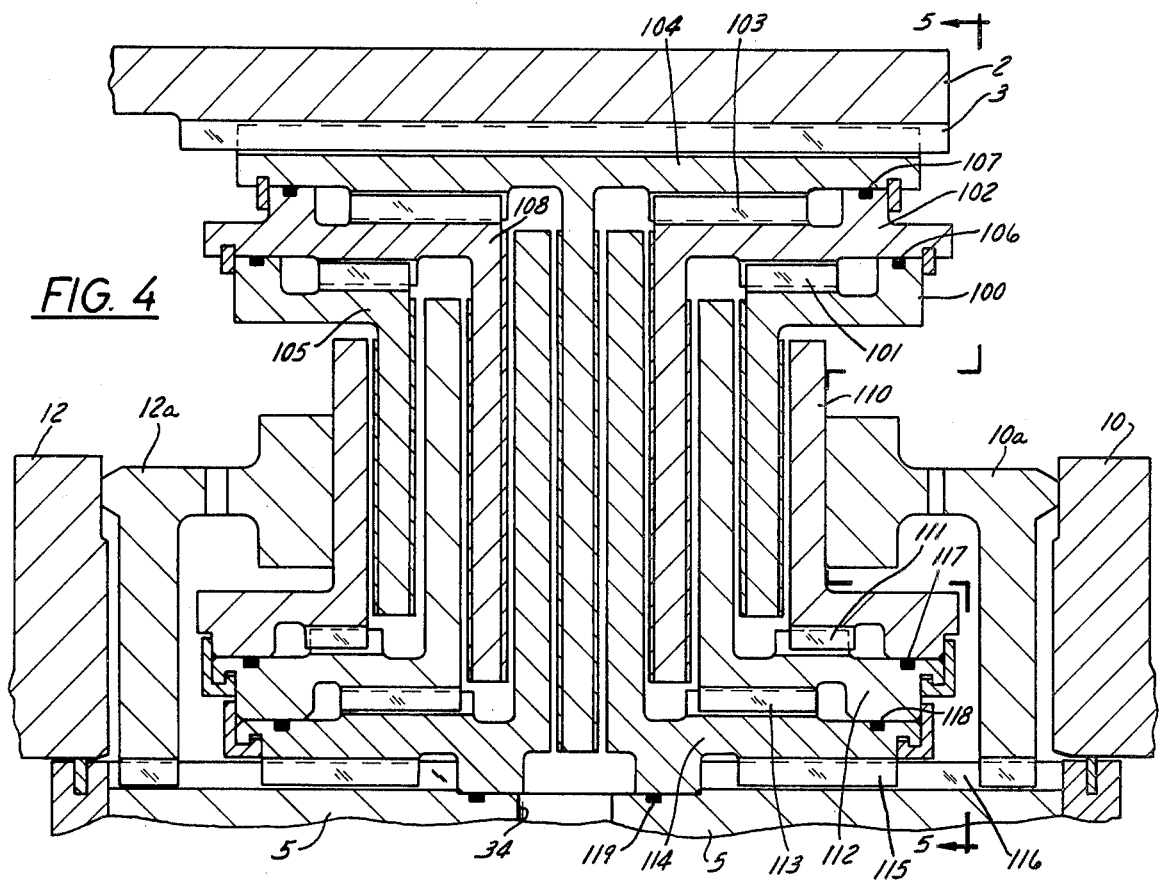
FIG. 4 is a view similar to FIG. 2, but showing a modified form of clutch pack useable with the FIG. 1 device, but also on an enlarged scale from FIG. 1.

The clutch packs shown in FIGS. 2 and 4 are adapted to be used in the clutch arrangement shown by way of example in FIG. 1 and a more detailed reference will now be made to those clutch packs.

As shown in FIG. 2, hub 5 has external splines 38 on which are axially slideably mounted the clutch apply members 10a and 12a and the various clutch plates now to be described. A first set of clutch plates include the externally toothed clutch plates 40, 41, 42 and 43 which are formed generally as annular dish-shaped plates having axially extending cylindrical walls, for example 40a of plate 40 and which also have outer ends formed as teeth 40b by means of which the plates have an axial slideable connection relative to the spider or driven member 2. It will also be noted that sealing means 50 in the form of a flexible o-ring are provided between the adjacent cylindrical walls of the stepped type clutch plates. For example, sealing means 50 is provided between wall 40a and 41a of pistons 40 and 41, respectively and sealing means 51, 52 and 53 are also provided between the other adjacent pistons.

The clutch pack also includes a second set of plates which are internally toothed clutch plates 60, 61 and 62 and which are also of stepped construction, having their inner ends terminating in teeth that slide axially and for driving connection with the splines 38 of the hub. Sealing means 64, 65 and 66 are also provided between the adjacent cylindrical walls of the plates and also between the cylindrical walls of plate 62 and the hub 5. The plates 67, 68 and 69 are similarly constructed and arranged.

A floating separator clutch plate 70 is also interposed intermediate the axial length of the clutch pack and this clutch plate has a series of radially outer teeth 71 that are in driving engagement with the spline 3 of the driving member 2. This floating separator plate acts to equalize the thrust on the plates imposed by the oppositely acting, hydraulically actuated engaging means.

It will be appreciated that the driving member 2 may function as a driven member if the power is furnished to the shaft 4 which would then constitute the driving member. In other words, the direction of power flow through the clutch may be reversed.

When the fluid pressure is released from clutch actuating chambers 14 and 16, the clutch plates separate from one another and the plates are counter-rotating, and the phenomenon of clutch flutter, wobble or gyroscopic instability occurs. In large clutches, this clutch plate wobble is of such magnitude that the clutch will burn out in a relatively short period of time.

By having the above sealing means between the plates of the clutch, fluid pressure is introduced, via fluid passage 34 and into the central portion of the clutch pack where it then flows in the space between adjacent clutch plates radially outwardly and radially inwardly in serpentine fashion as viewed in FIG. 2, completely covering the entire surfaces of all of the clutch plates. For example, fluid pressure of about 30 to 40 p.s.i. may be introduced into the clutch pack and this pressurized fluid then flows past the surfaces of the plates and this flow is relatively slow and pressure is maintained between the clutch plates. When the flow reaches approximately the point 80 in the clutch pack, it then flows radially outwardly between the last two clutch plates at a more rapid rate and then is discharged at the approximate location 82. During this clutch released operation, all of the spaces between the clutch plates are full and the clutch surfaces are completely covered, with the possible exception of the space between the outermost clutch plates 60 and 40 where the flow of fluid may be more rapid.

The flow of pressure fluid through the clutch at the left hand side at FIG. 1 would be that similar and simultaneous with the right other side. Thus two distinct oil flow paths occur, one towards each end of the clutch pack. As stated previously, the clutch may be of the type where only a single actuator is used and a central floating separating plate 70 would not be used.

It will be noted that snap rings 90, 91, 92 and 93 are provided for the internally toothed plates and similar snap rings 94, 95, 96 and 97 are provided, respectively for the exteriorily toothed clutch plates 40, 41, 42 and 43 so as to limit the axial movement of the plates in the clutch released direction.

Figure 5:
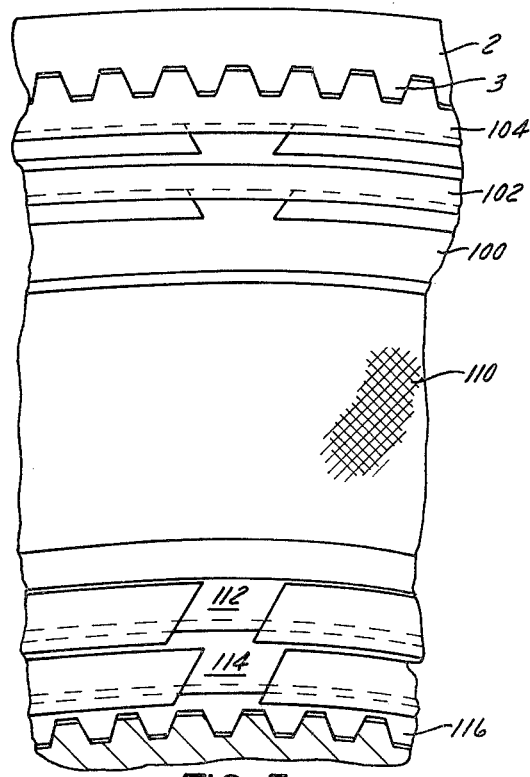
FIG. 5 is a fragmentary, transverse, cross-sectional view taken generally along the line 5—5 in FIG. 4.

Referring now to the embodiment of the invention shown in FIGS. 4 and 5, the general operating characteristics are generally the same as shown in connection with FIG. 2. However, it will be noted that in the FIG. 4 device, the exteriorily toothed plates are not all axially splined to the spider member 2, but instead are radially stacked, one upon another and splined to each other. For example, plate 100 is splined at 101 to plate 102, and plate 102 is splined at 103 to the central floating separator plate 104. The left side of FIG. 4 is similarly constructed with plates 105 and 108. Sealing means 106 and 107 are provided between plates 100 and 102 and between plates 102 and 104, respectively.

Similarly, the internally toothed clutch plates are radially stacked on one another, plate 110 being splined at 111 to plate 112, and plate 112 is splined at 113 to plate 114. Plate 114 in turn is splined at 115 to the spline 116 of the hub 5. Suitable sealing means 117, 118 and 119 are then also provided between the adjacent plates and between plate 114 and hub 5.

Figure 6:
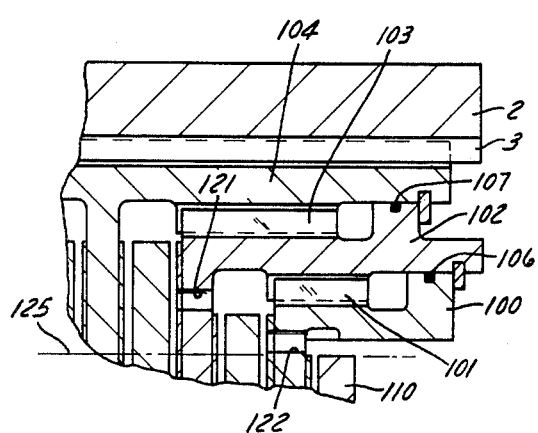
FIG. 6 is a fragmentary view of a portion of the FIG. 4 clutch, showing a modification.

The modification shown in FIG. 6 illustrates the use of the invention by using a centrifugal head of oil which acts only on a portion of the plates to positively separate and holds the released, counterrotating plates from fluttering. For that purpose a series of holes 121 are located in and circumferentially spaced around the externally toothed plate 102, and holes 122 are located around the externally toothed plate 100, and also through the corresponding plates on the left hand side of the clutch. These holes are shown as located adjacent the radial outward portion of the plate and they permit most of the fluid to shortcut the entire serpentine path between the plates and instead most of the fluid flows through the holes and more or less directly axially through the pack at the radially outer portion thereof, thus permitting pressure head build-up between the plates only radially outwardly of the holes. As a result the fluid between the plates accumulates generally only radially beyond the line 125 to create the fluid head. This eliminates an accumulation of pressure fluid in some of the space between the counter-rotating released plates and accordingly results in lower drag and reduces viscous shear therebetween.

Figure 7:
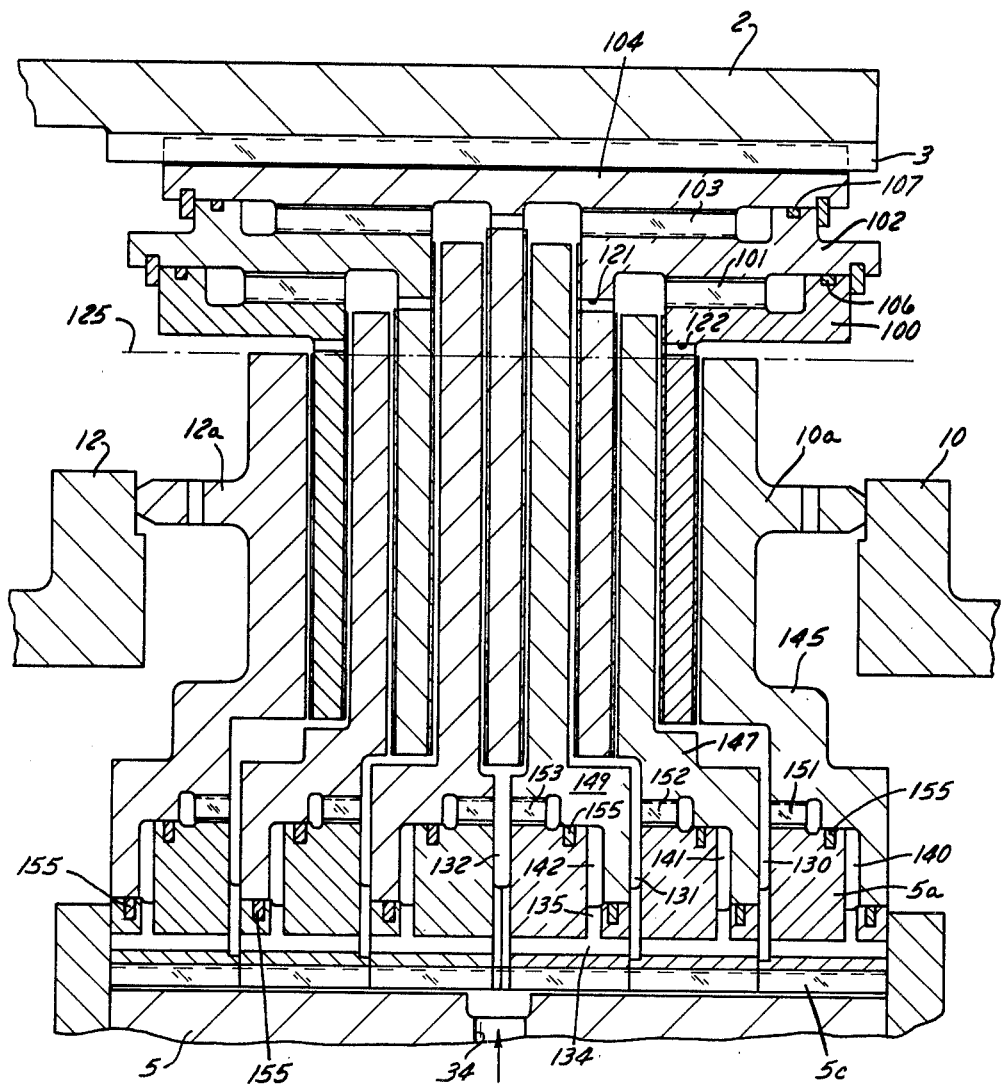
FIG. 7 is a view generally similar to FIG. 4, but showing a modified form of the invention utilizing the feature of FIG. 6 and in addition, also utilizing an additional feature in the lower portion of the figure.

FIG. 7 shows an embodiment of the invention which uses a minimal flow of oil through the plates to consequently reduce viscous drag to a minimum, but at the same time provides a positive and substantial force to hold the plates against wobbling when the clutch is released. This embodiment of the invention is similar to that shown in FIG. 6 as far as the radially outer portion of the clutch pack assembly is concerned and corresponding parts have been similarly numbered to those shown in FIG. 6. Cooling and lubricating oil is introduced via passages 130, 131 and 132 to the area between the plates and this fluid passes radially outwardly to create a centrifugal head at the outer portion of the clutch, and the fluid is generally located along the line 125, that is along an axial line which includes the radially innermost holes 122. In this manner, substantially only centrifugal pressure acts at the radially outer portion of the clutch pack to hold the plates stable.

At the radially inner side of the clutch packs, as shown in FIG. 7, fluid passages 134 and 135 convey fluid to the pressurized chambers 140, 141 and 142 which are located between the back-up plate 145, the plate 147 and plate 149, respectively. The hub 5 includes a radially outer portion 5a which is splined thereto as at 5c, thereby radially extending the diameter of the hub so that the back-up plate 145, plate 147 and plate 149 may be keyed to the hub as it, respectively, 151, 152, and 153. Suitable annular seal and groove means 155 are provided between the hub and the plates so that chambers 140, 141 and 142 can be pressurized and thereby sustain a centrifugal head. Thus, the inner portion of the clutch pack utilizes pressure fluid as well as a centrifugal head to hold the clutch plates against wobbling when they are in the clutch released position.

RECAPITULATION

Fluid pressure in the released plate pack can be generated either by the resistance to oil flow through the serpentine inward and outward flow path; by the final exit area restriction, or by centrifugal oil head build up. It may be desirable to rely only on centrifugal head acting on only a portion of the plates, to positively separate and hold the plates against flutter.

In any event, fluid pressure is utilized in the space between the clutch plates when the clutch is in the released position and the clutch plate sets are counter-rotating, so as to positively hold the clutch plates normal to the axis of rotation of the clutch, and thereby prevent clutch plate flutter, wobble or other gyroscopic instability of the clutch plates. Improved cooling oil distribution to the clutch plate interfaces is also secured.

What I claim is:

1. A multiple, interleaved friction plate clutch comprising, a driving member, a driven member and a clutch pack between said driving and driven members, said pack comprising a plurality of externally toothed clutch plates having an axially slideable connection relative to one of said members for driving engagement therewith, said pack also including a plurality of internally toothed clutch plates which are interleaved with said externally toothed clutch plates and which have an axially slideable connection relative to the other of said members, means for clamping said interleaved plates together to provide a releasable driving connection between said members, whereby said plates may be shifted between a clutch clamp-up position and a clutch released position in which said plates are separated from one another and have relative rotation therebetween, fluid sealing means between said externally toothed plates, second fluid sealing means between said internally toothed plates, and fluid pressure means acting between said plates to positively hold said plates under fluid pressure and normal to the axis of rotation of said clutch when said clutch is in said released position and said plates are separated from one another and have relative rotation therebetween, to thereby prevent wobble of said clutch plates.

2. The clutch set forth in claim 1 further characterized in that said clutch plates are formed generally as annular dish-shaped plates having an axially extending, cylindrical wall, and said sealing means are located on said walls to provide an axially sliding sealing fit between said plates.

3. The clutch set forth in claim 1 further characterized in that said means for clamping said plates includes a hydraulically actuated piston at each end of said pack, and a central floating separating plate having an axially sliding connection with one of said members and located intermediate the axial length of said clutch pack.

4. The clutch set forth in claim 3 further characterized in that said clutch plates are formed generally as annular dish-shaped plates having an axially extending, cylindrical wall, and said sealing means are located on said walls to provide an axially sliding sealing fit between said plates.

5. The clutch set forth in claim 1 further characterized in that at least some of said externally toothed plates have holes therethrough and which are circumferentially spaced therearound and which radially limit the build-up of fluid pressure head between the counter-rotating plates.

6. The clutch set forth in claim 2 further characterized in that at least some of said externally toothed plates have holes therethrough and which are circumferentially spaced therearound and which radially limit the build-up of fluid pressure head between the counter-rotating plates.

7. The clutch set forth in claim 3 further characterized in that at least some of said externally toothed plates have holes therethrough and which are circumferentially spaced therearound and which radially limit the build-up of fluid pressure head between the counter-rotating plates.

8. The clutch set forth in claim 4 further characterized in that at least some of said externally toothed plates have holes therethrough and which are circumferentially spaced therearound and which radially limit the build-up of fluid pressure head between the counter-rotating plates.

9. A multiple, interleaved friction plate clutch comprising a driving member, a driven member and a clutch pack between said driving and driven members, said pack comprising a plurality of externally toothed clutch plates having an axially slideable connection relative to one of said members for driving engagement therewith, said pack also including a plurality of internally toothed clutch plates which are interleaved with said externally toothed clutch plates and which have an axially slideable connection relative to the other of said members for clamping said interleaved plates together to provide a releasable driving connection between said members, whereby said plates may be shifted between a clutch clamp-up position and a clutch released position in which said plates are separated from one another and have relative rotation therebetween, fluid sealing means between said externally toothed plates, second fluid sealing means between said internally toothed plates, whereby when said clutch plates are in said clutch released position and there is relative rotation therebetween, the space between said plates is sealed, and passage means for providing fluid pressure into said sealed space between said plates whereby fluid can flow through said clutch pack under pressure and be discharged therefrom so as to pressurize the space between said plates when said clutch is disengaged to thereby prevent wobble of said clutch plates.

10. The clutch set forth in claim 9 further characterized in that said clutch plates are formed generally as annular dish-shaped plates having an axially extending, cylindrical wall, and said sealing means are located between said walls to provide an axially sliding sealing fit between said plates.

11. The clutch set forth in claim 9 further characterized in that said means for clamping said plates includes a hydraulically actuated piston at each end of said pack, and a central floating separating plate having an axially sliding connection with one of said members and located intermediate the axial length of said clutch pack.

12. The clutch set forth in claim 11 further characterized in that said clutch plates are formed generally as annular dish-shaped plates having an axially extending, cylindrical wall, and said sealing means are located on said walls to provide an axially sliding sealing fit between said plates.

13. The clutch set forth in claim 9 further characterized in that at least some of said externally toothed plates have holes therethrough and which are circumferentially spaced therearound and which radially limit the build-up of fluid pressure head between the counter-rotating plates.

14. The clutch set forth in claim 10 further characterized in that at least some of said externally toothed plates have holes therethrough and which are circumferentially spaced therearound and which radially limit the build-up of fluid pressure head between the counter-rotating plates.

15. The clutch set forth in claim 11 further characterized in that at least some of said externally toothed plates have holes therethrough and which are circumferentially spaced therearound and which radially limit the build-up of fluid pressure head between the counter-rotating plates.

16. The clutch set forth in claim 12 further characterized in that at least some of said externally toothed plates have hole therethrough and which are circumferentially spaced therearound and which radially limit the build-up of fluid pressure head between the counter-rotating plates.

17. A friction plate clutch of the interleaved multiple plate type and comprising, a driving member, a driven member and a clutch pack between said driving and driven members, said pack comprising a plurality of externally toothed clutch plates having an axially slideable connection relative to one of said members for driving engagement therewith, said pack also including a plurality of internally toothed clutch plates which are interleaved with said externally toothed clutch plates and which have an axially slideable connection relative to the other of said members, means for clamping said interleaved plates together to provide a releasable driving connection between said members, whereby said plates may be shifted between a clutch clamp-up position and a clutch released position in which said plates are separated from one another and have relative rotation therebetween, fluid sealing means between said plates to form a sealed space between said plates when said clutch plates are in said clutch released position, and passage means for providing fluid pressure into said sealed space between said plates whereby fluid can flow under pressure radially outwardly and inwardly between adjacent plates and thus through said clutch pack to pressurize the space between said plates when said clutch is released to thereby prevent clutch plate wobble.

18. The clutch set forth in claim 17 further characterized in that said clutch plates are formed generally as annular dish-shaped plates each having an axially extending, cylindrical wall, said walls of adjacent plates telescopingly slideable relative to one another, and said sealing means are located between adjacent said walls to provide an axially sliding seal between said plates.

19. The clutch set forth in claim 17 further characterized in that said means for clamping said plates includes a hydraulically actuated piston at each end of said pack, and a central floating separating plate having an axially sliding connection with one of said members and located intermediate the axial length of said clutch pack.

20. The clutch set forth in claim 19 further characterized in that said clutch plates are formed generally as annular dish-shaped plates having an axially extending, cylindrical wall, and said sealing means are located on said walls to provide an axially sliding sealing fit between said plates.

21. The clutch set forth in claim 17 further characterized in that at least some of said externally toothed plates have holes therethrough and which are circumferentially spaced therearound and which radially limit the build-up of fluid pressure head between the counter-rotating plates.

22. The clutch set forth in claim 18 further characterized in that at least some of said externally toothed plates have holes therethrough and which are circumferentially spaced therearound and which radially limit the build-up of fluid pressure head beween the counter-rotating plates.

23. The clutch set forth in claim 19 further characterized in that at least some of said externally toothed plates have holes therethrough and which are circumferentially spaced therearound and which radially limit the build-up of fluid pressure head between the counter-rotating plates.

24. The clutch set forth in claim 20 further characterized in that at least some of said externally toothed plates have holes therethrough and which are circumferentially spaced therearound and which radially limit the build-up of fluid pressure head between the counter-rotating plates.

* * * * *